Feb. 3, 1959
A. G. L. MOUTET
2,871,758
DEVICES FOR MEASURING THE TEMPERATURE OF A GASEOUS
FLUID AND IN PARTICULAR OF A FLAME
Filed April 22, 1955
4 Sheets-Sheet 1
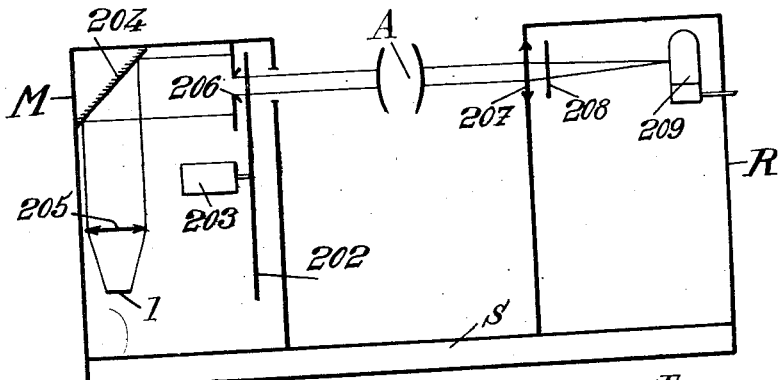
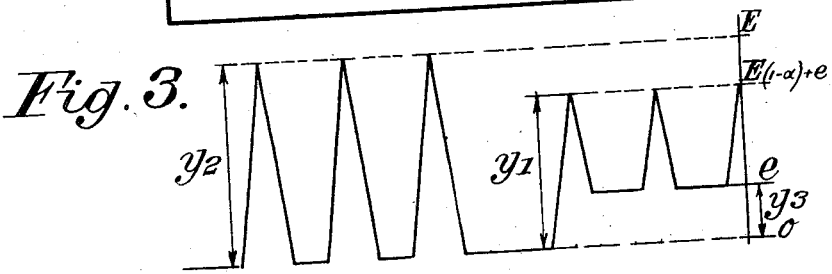
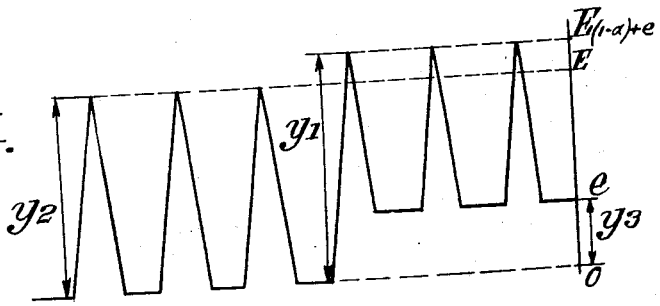
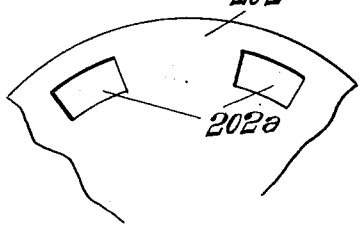
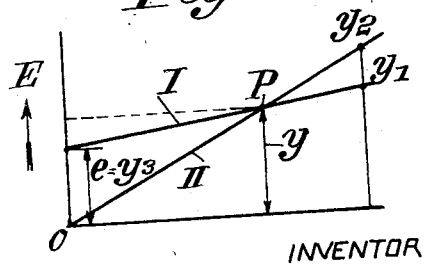
INVENTOR
André, Georges, Lucien Moutet
BY
Bailey, Stephens and Huettig
ATTORNEYS

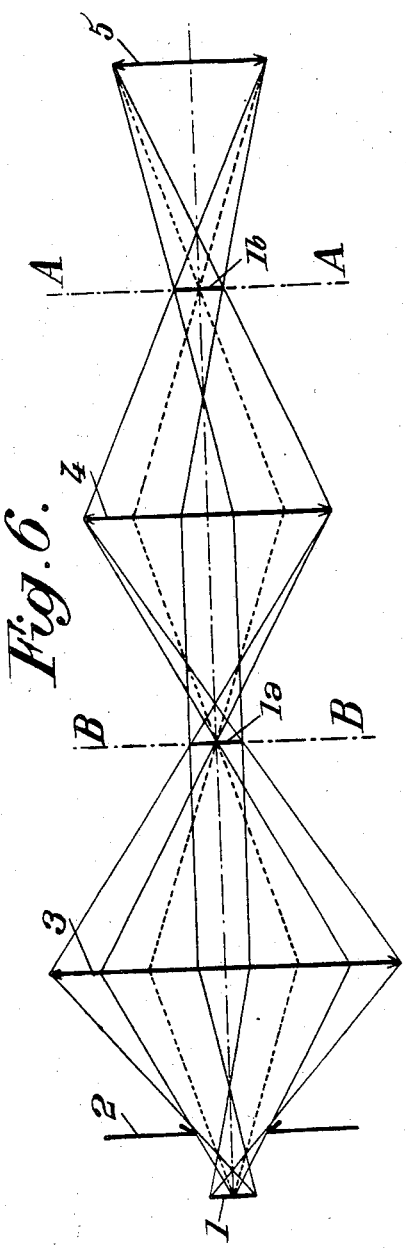
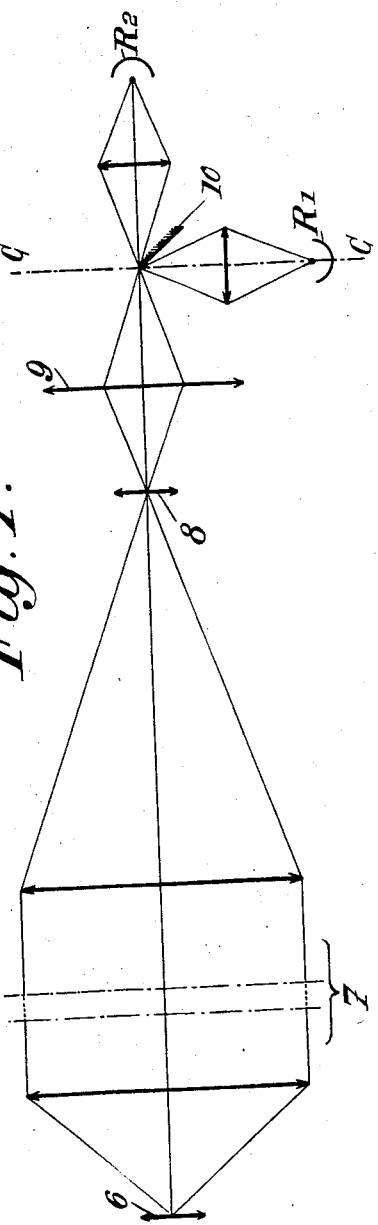

Feb. 3, 1959  A. G. L. MOUTET  2,871,758
DEVICES FOR MEASURING THE TEMPERATURE OF A GASEOUS
FLUID AND IN PARTICULAR OF A FLAME
Filed April 22, 1955  4 Sheets-Sheet 3
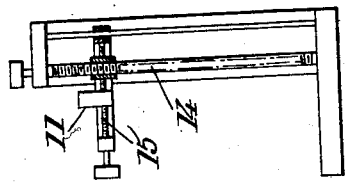
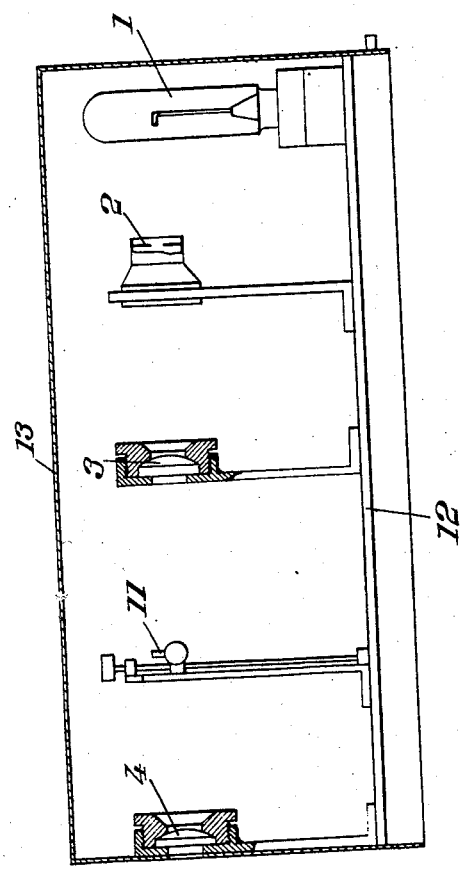
INVENTOR
André, Georges, Lucien Moutet
BY
Bailey Stephens and Huttig
ATTORNEYS

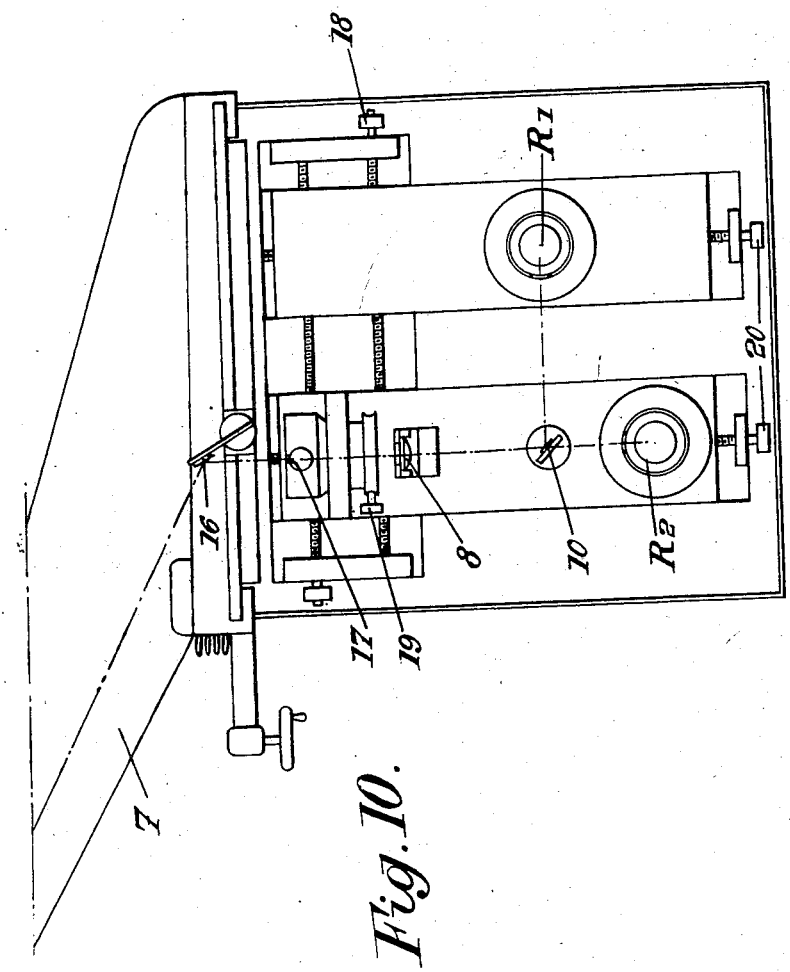

United States Patent Office 2,871,758
Patented Feb. 3, 1959

2,871,758

DEVICES FOR MEASURING THE TEMPERATURE OF A GASEOUS FLUID AND IN PARTICULAR OF A FLAME

André Georges Lucien Moutet, Villaine par Massy, France, assignor to Office National d'Etudes & de Recherches Aeronautiques O. N. E. R. A., Châtillon-sous-Bagneux, France, a society of France Application April 22, 1955, Serial No. 503,264

Claims priority, application France January 26, 1952

5 Claims. (Cl. 88—22.5)

The present invention relates to devices for measuring the temperature of an energy radiating gaseous fluid, and more particularly of a flame.

It is known to determine such a temperature by sending a beam of light through a flame and by-passing another beam of light from the same source around said flame by a series of mirrors. A system of mechanical shutters causes these two beams of light to fall alternately upon a photo-cell. This photo-cell is connected to various monitoring and amplifying circuits. If the brightness of the light source is adjusted so that the photo-cell receives the same amount of light from the beam that passes through the flame and from the beam that passes around it, the temperature of the flame bears a known relation to the temperature of the light source.

Such devices are at best difficult to operate, because adjustment of the light source brightness to obtain that both beams transmit the same amount of light is a difficult operation. Furthermore if the flame temperature is subject to sudden variations, such an adjustment becomes practically impossible.

The object of my invention is to provide a device based on the same principle but which is free from the above stated drawbacks.

My device makes use of a single beam of light supplied by a source of fixed known brightness, through which beam (or through a portion of which) is passed the flame (or stream of energy radiating gaseous fluid) the temperature of which is to be measured. Energy measurement means are provided on the other side of said flame from said source for recording, at least substantially at the same time, the radiating energy of the flame alone and the radiating energy of said beam (or beam portion) issuing from said flame. It is then possible, knowing these two energies and the energetic brightness of the light source for the wavelength of the beam issuing therefrom, to determine the temperature of the flame.

According to a first embodiment of my invention, the whole of the light beam is made to pass through the flame but is cut off intermittently, so that the same energy measurement means record the radiating energy of the beam issuing from said flame during the periods when the beam is allowed to pass on and the radiating energy of the flame alone during the periods when the beam is cut off, the rate of interrution being high enough to make the measurements thus obtained practically equal to what they would be if they were made simultaneously.

According to another embodiment, the light beam directed toward the flame is partly cut off, upstream of the flame, by a transverse fixed shutter extending across a portion, preferably one half, of its cross section, so that a composite beam travels downstream of the flame, one portion of said last mentioned beam being the remainder of the original beam transmitted from the source of fixed brightness and the other portion being transmitted from the flame alone. The energy measurement means give the respective energies supplied by said two respective portions of the composite beam.

This application is a continuation-in-part of my patent application Serial No. 270,089, filed on February 5, 1952, entitled "Method and Apparatus for Measuring the Temperatures of Gaseous Fluids and in Particular Flames," and now abandoned.

Preferred embodiments of my invention will be hereinafter described with reference to the accompanying drawings, given merely by way of example and in which:

Fig. 1 is a side view of a device made according to a first embodiment of my invention.

Fig. 2 is a partial transverse view of a portion of this device.

Figs. 3 and 4 show oscillograms obtained with the device of Fig. 1.

Fig. 5 is a view illustrating a graphic method of determining the flame temperature.

Figs. 6 and 7 are diagrammatical views showing the optical lay-out of a measurement device according to another embodiment of my invention.

Fig. 8 is a diagrammatical view of the elements of the device of Figs. 6–7 located upstream of the flame the temperature of which is to be measured.

Fig. 9 shows a detail of the device of Fig. 8.

Fig. 10 diagrammatically shows the receiving elements of the device of Figs. 6–7 disposed downstream of a spectrograph or analogous apparatus the inlet slot of which receives the rays coming from the flame.

The device illustrated by Figs. 1–5 comprises two units disposed at any desired distance from each other on opposite sides of the flame to be measured. One of these units, designated by M in Fig. 1, supplies and modulates the beam to be passed through the flame. The other unit, designated by R, includes the energy receiving and measuring means. Units M and R are preferably mounted on a common support E.

The modulator unit M includes a source 1 of known energetic brightness, a moving modulating element, such as a rotating disc 202, driven for instance by an electric motor 203 and means, including for instance a mirror 204, intended to project the light beam from source 1 onto the portion of disc 202 which carries the beam energy modulating means.

Although disc 202 may be provided with filters or with an aperture of varying width, the example illustrated by Figs. 1 to 5 includes a particularly simple arrangement according to which disc 202 is provided with mere orifices 202a (Fig. 2) all of the same shape, disposed along an annular band of the disc, where they alternate with solid portions, whereby the beam energy has alternately zero value and maximum value. These orifices may be either circular or polygonal, for instance as shown by Fig. 2.

In order to obtain a correct modulation effect, the beam should be made parallel by making use of means disposed upstream of the disc. Such means consist for instance, as shown by Fig. 1, of an objective 205 interposed between source 1 and mirror 204 in such position that its focus is located on the filament of lamp 1. The parallel beam thus formed is first reflected at 90° by mirror 204 and passes through a diaphragm 206 before striking disc 202 on the portion thereof which carries the row of apertures 202a.

The receiver unit R includes an entrance objective 207 through which the beam enters this block to pass either through an interference filter 208 (when the wave-length pass-band averages 100 Angstroms or is even larger) or through a monochromator, for small wavelength bands (up to 1 Angstrom). The beam is then sent onto a photo-electric cell 209 or the like, preferably of the photomultiplier type which, through an amplifier not shown in the drawing, acts upon a cathode ray oscilloscope or oscillograph, or other indicating or recording apparatus.

In order to measure a flame temperature with such a device, I proceed as follows: The system constituted by the modulator unit and the receiver unit is operated without interposing the flame between these two units. I thus obtain an oscillogram on the screen of the cathode ray oscilloscope operated by photo-electric cell 209. This oscillogram is such as shown by the left hand side of Fig. 3. It consists of a zigzag or toothed line the top points of which are located at level E (E designating the energy corresponding to the brightness of source 1) and the bottom points of which are at zero level. The ordinate corresponding to brightness E is $y_2$. This oscillogram is recorded, for instance by photographing the screen of the oscilloscope. The flame A to be measured is then interposed between units M and R, and the same operations are performed. The record then obtained may have either the form shown on the right hand side of Fig. 3 or that shown on the right hand side of Fig. 4. The ordinates $y_1$ of the tops of the teeth of this record correspond to value $E(1-\alpha)+e$ ($\alpha$ being the coefficient of absorption of the flame for the wavelength $\lambda$ of the radiation supplied by source 1), whereas the ordinates $y_3$ of the lower portions thereof correspond to the energy $e$ given off by the flame. This oscillogram also is recorded by photographing the screen of the oscilloscope.

The curves thus obtained supply all the elements necessary for tracing lines I and II (Fig. 5). Line II passes through the origin O of the system of coordinates and through a point having an ordinate equal to $y_2$. Line I passes through a point located on the same vertical as the last mentioned point and the ordinate of which is $y_1$ and through a point having, for abscissa O, an ordinate equal to $y_3$. The straight lines I and II thus obtained intersect each other at a point P the ordinate $y$ of which corresponds to the coefficient of transmission $\tau$ of the filter which should be interposed across the beam issuing from source 1 to have the energy absorbed by the flame equal to the energy given off by said flame. In other words, ordinate $y$ corresponds to the value of E for which $E=E(1-\alpha)+e$.

The value of $y$ may also be determined by formula $$y = \frac{y_2 y_3}{y_2 + y_3 - y_1}$$

Of course, I make use of a cathode ray oscilloscope when high speed variations are used. For average speeds, I may use a low period galvanometer and for still lower speeds, I may use a recording apparatus of the type making use of a recording pen.

It should be pointed out that Figs. 3 and 4 correspond to the case of flames having a constant temperature. In the case of a flame having a varying temperature, values $y_1$ and $y_3$ would vary as a function of the flame temperature.

Referring now to the embodiment of Figs. 6 to 10, the flame is indicated by the plane A—A in which it is located. A light beam, hereinafter called measurement beam, is emitted from a source 1 the energetic brightness E of which for a given wavelength $\lambda$ is known. This source is for instance constituted by a tungsten filament, for instance the filament of an incandescent lamp of 6 volts and 100 watts.

Between this source 1 and the plane A—A of the flame, there is provided a diaphragm 2 and optical means 3 which form at 1a in plane B—B an image of filament 1 which is of the same size as said filament. In the same plane, according to my invention, there is provided an adjustable shutter having a sharp rectilinear edge, which serves to cut off a portion, and preferably one half, of the light beam forming image 1a in plane B—B. A second optical system 4 gives in plane A—A an image 1b of said image 1a, this second image being constituted only for one half thereof by the measurement beam coming from filament 1, whereas the other half is formed by the portion of the shutter which, in plane B—B, has cut off one half of the image of filament 1. A third optical system 5, disposed downstream of the flame, projects the rays coming from plane A—A onto the entrance slot of a dispersive system, in particular a spectrograph. This entrance slot is provided with a field lens 6 (Fig. 7), whereas the inner optical system of this spectrograph is diagrammatically indicated by 7 and its exit slot by 8.

Due to the fact that one half of image 1a has been cut off by the shutter, only the portion of the original beam that has not been stopped by said shutter arrives to the spectrograph and passes therethrough, transmitting an energy which corresponds to value $E(1-\alpha)+e$. (As above stated $\alpha$ is the coefficient of absorption of the flame and $e$ the energy given off by the flame). The other portion of the final beam corresponds to the flame and has an energy equal to $e$. In order to be able to measure on the one hand the value $E(1-\alpha)+e$ and, on the other hand, the value $e$, for a given wavelength $\lambda$, it suffices to separate, downstream of the spectrograph, the two above mentioned portions of the final beam and to send them directly onto two distinct receivers (for instance two photo-electric cells).

For this purpose, I form downstream of the exit slot 8 of the spectrograph, and by means of an optical system 9, a monochromatic image of the source in plane C—C and I dispose, at the place where this image is formed, a mirror 10 (aluminium mirror) which deflects, for instance, the portion of the final beam corresponding to the flame and the energy of which corresponds to value $e$, toward a receiver $R_1$, whereas the other portion of this beam, which corresponds to the initial source and the energy of which has a value corresponding to $E(1-\alpha)+e$, is not deflected and reaches a receiver $R_2$. The indications of these receivers therefore permit of determining the energies of these two portions of the beam.

Figs. 8, 9 and 10 show the main portions of the apparatus the construction of which corresponds to the layout of Figs. 6 and 7.

According to Fig. 8, the tungsten filament lamp 1, diaphragm 2, optical system 3, support of shutter 11 and optical system 4 are mounted on a common support 12 inside a casing 13. Shutter 11 is adjustable both horizontally and vertically. For this purpose, I make use of two screws 14 and 15 disposed vertically and horizontally. The sharp straight edge of the shutter, which divides the measurement beam into two halves one of which is cut off, is, as shown by Fig. 9, the vertical edge on the left hand side of the shutter.

Fig. 10 diagrammatically shows the spectrograph 7 from which the beam is directed through a mirror 16 onto an adjustable slot 17. The optical system 8 produces an image of the source of the beam on the portion of the mirror 10 which, as above described, deflects a portion of the beam toward receiver $R_1$. The apparatus further includes means for adjusting the width of slot 17 and means for adjusting the value of $\lambda$. Means are also provided for keeping the light rays truly parallel and for focussing the images, these last mentioned means being designated by 18, 19 and 20.

Such an apparatus is used as follows:

Shutter 11 is first removed and the filament of lamp 1 is brought to the desired temperature to obtain the proper brightness. Receivers $R_1$ and $R_2$ then give indications which, originally, may not be identical. As a matter of fact, the differences between their measurements may be due to the fact that mirror 10 does not divide the beam into two portions which are strictly equal to each other, that the sensitiveness of every receiver is not the same for both and that mirror 10 has a reflexibility coefficient lower than 1. Of course, the difference between the indications of the receivers must not be due to differences of brightness between portions of the filament, as a uniform brightness of all portions of the filament is an essential condition in order to obtain satisfactory measurement results.

The differences that may exist between the measurements given by the two receivers are then compensated for by adjustment of the amplifier of one or the other of these receivers until their indications are identical. Then, shutter 11 is inserted into the apparatus and adjusted to the desired position, which is that for which the indication given by receiver $R_1$ is once more zero, whereas the indication of the other receiver $R_2$ remains unchanged. At this time, the shutter therefore divides the beam into two strictly equal portions same as mirror 10 and the device can be used for measuring the values $E(1-\alpha)+e$ and $e$. The apparatus is then placed, with respect to the flame the temperature of which is to be measured, in a position such that the image $1b$ is in the plane of the flame and the measurements respectively received by the receivers $R_1$ and $R_2$ are then recorded. That indicated by receiver $R_1$ corresponds to $e$ and that indicated by receiver $R_2$ corresponds to $E(1-\alpha)+e$. Since the energetic brightness of the source 1 is known, all the parameters necessary for calculating the flame temperature are known. In view of the fact that the two values $E(1-\alpha)+e$ and $e$ are obtained simultaneously and without requiring the operation of any movable mechanical part, the device which has been described makes it possible to determine the temperature of a flame which varies very quickly. It is therefore particularly adapted for studying phenomenons of the detonating or explosive character. It is true that the indications given by the two receivers $R_1$ and $R_2$ do not correspond exactly to the same portions of the flame but to portions very close to each other. However, by reducing the areas of these portions to the minimum that can be accepted with the receivers in use (the total area of the portion that is explored may be a fraction of 1 sq. mm., for instance 1/10 of a sq. mm.), the error due to the fact that the regions that are studied are not exactly coincident is negligible, even in the case of a flame which is not in thermal equilibrium. Of course, this error is equal to zero when the flame is in thermal equilibrium.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:
1. A device for measuring magnitudes to determine the temperature of a flame which comprises, in combination, means for measuring the radiating energy emitted by a given area of said flame alone, a source of radiation of known and constant energetic brightness, means for forming a radiation beam from said source, means for positioning across said beam an area of said flame equal to that above mentioned, and means on the other side of the flame from said source for measuring the radiating energy transmitted through said flame, said last mentioned energy being the sum of the radiating energy of said given area of the flame and of the radiating energy left in said beam after its passage through said flame, whereby comparison of said two radiating energies indicates the temperature of the flame.

2. A device for measuring the temperature of a flame, which comprises, in combination, a source of light of known energetic brightness for a given wave-length, means for forming a parallel light beam from said source, means in the path of said light beam for measuring and recording the radiating energy along the path, shutter means in said path between said source and measuring means for periodically stopping said beam, means for interposing said flame across said beam between said shutter means and said measuring means, whereby said measuring means, when said shutter means stops the beam, measures the light emitted from said flame only, whereas at other times said measuring means measures the sum of the radiating energy transmitted from said source after its passage through the flame plus the light emitted from the flame, comparison of said two energies indicating the temperature of the flame.

3. In a device as claimed in claim 1, a transverse shutter extending across said beam between said source and the flame to cut off a portion of the beam.

4. A device as claimed in claim 3 in which said shutter has a straight edge.

5. In a method of measuring the temperature of a variable energy radiating gaseous fluid, the steps which comprise positioning a stream of said gaseous fluid across a beam of light emitted by a source of known and constant energetic brightness, interposing between said source and said stream at least for a part of the time of measurement shutter means for cutting off at least a part of said light beam, and measuring at least practically simultaneously the radiating energy of said gaseous fluid stream alone when said shutter is interposed and the sum of the energies of the light beam which has passed through said stream plus the radiating energy of the stream when said shutter is not interposed, whereby comparison of said two radiating energies indicates the temperature of the flame.

References Cited in the file of this patent
UNITED STATES PATENTS
2,690,511     Elion _____ Sept. 28, 1954
FOREIGN PATENTS
845,513     France _____ May 15, 1939
OTHER REFERENCES Fundamentals of Physical Optics, Jenkins and White, published by McGraw-Hill Book Co., Inc., New York, 1937. Pages 261, 262 relied on.

Instruments, volume 20, November 1947, pages 978 and 980.